Sept. 24, 1957    A. H. SEILLY    2,807,170
ENGINE STARTING MECHANISM
Filed Feb. 20, 1956
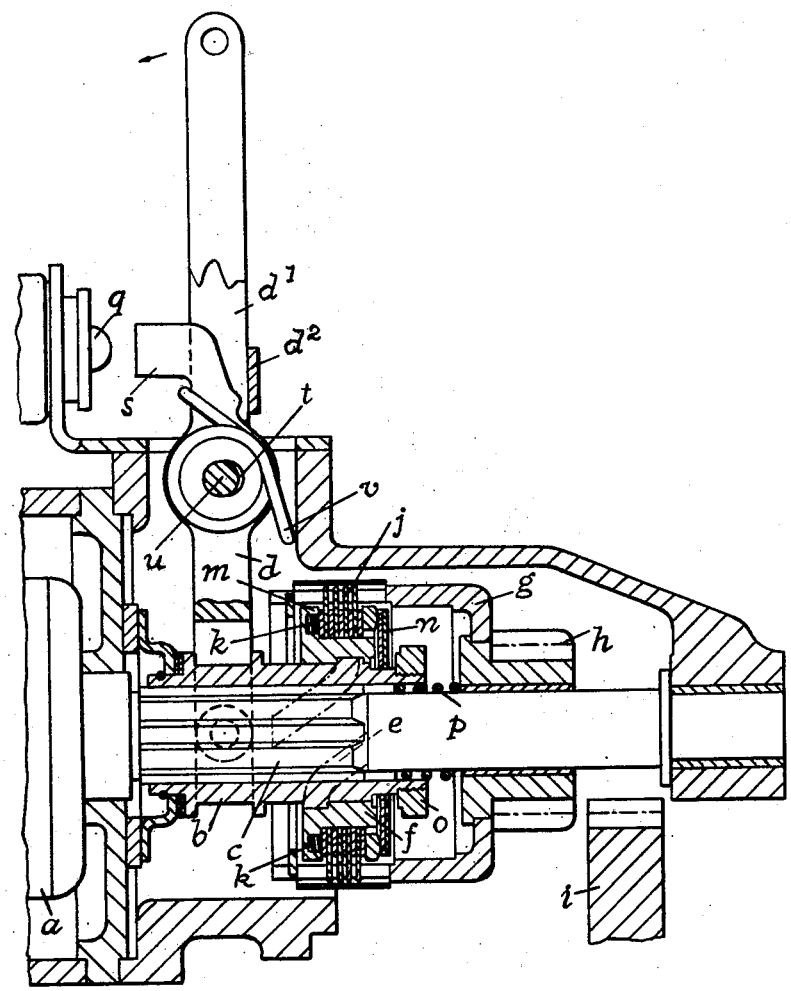
Inventor
A. H. Seilly
By Glascock Downing Seebold
Attys.

United States Patent Office 2,807,170
Patented Sept. 24, 1957

2,807,170

ENGINE STARTING MECHANISM

Alec Harry Seilly, North Wembley, England, assignor to C. A. V. Limited, London, England Application February 20, 1956, Serial No. 566,472

Claims priority, application Great Britain February 23, 1955

1 Claim. (Cl. 74—6)

This invention has for its object to provide in a simple, convenient and efficient form a mechanism for transmitting a starting-effort to an internal combustion vehicle or other engine from another power source.

A mechanism in accordance with the invention comprises the combination of a rotatable input member having axial freedom of movement relatively to a power source, and having a quick-pitch helix thereon, a complementary sleeve on the input member, a hollow output member having thereon a pinion for engagement with a toothed wheel on the engine, a friction clutch interconnecting the said sleeve and output member, and a spring located between the input and output members.

In one example as illustrated by the accompanying drawing, for use with an electric motor $a$ serving as the power source, there is provided an input member $b$ adapted for spline-connection with one end of the armature spindle $c$ of the motor, this member having axial freedom of movement and being operable by a lever $d$. On this member is formed a quick-pitch helix $e$ and on the said member is mounted a sleeve $f$ having in its bore a complementary helix.

The output member $g$ is of hollow cylindrical form and on one of its ends is secured a pinion $h$ for detachable engagement with a toothed wheel $i$ on the engine.

Between the sleeve $f$ and the output member $g$ is provided a friction clutch. Preferably this comprises an assembly of annular plates $j$ which have alternate spline or like connections with the sleeve and output member. The clutch plates are held in light contact with each other by a spring or springs $k$ located between one of the end plates and a collar $m$ on the sleeve. For effecting a tight contact between the plates, when the starting torque is exerted by the motor, a strong spring consisting of one or more resilient washers $n$ is located between the other end plate of the clutch and a collar $o$ on the input member. Further, another spring $p$ is provided with its ends supported on the input and output members.

The arrangement is such that when starting the engine, the mechanism above described is first moved by means of a hand lever $d^1$ acting on the lever $d$ through an abutment $d^2$, the lever $d$ acting on the input member for effecting engagement of the pinion $h$ with the wheel $i$ on the engine. If, in this movement, the ends of the pinion teeth encounter the ends of the wheel teeth, continued axial movement of the input member $b$ will cause an angular movement to be imparted to the output member $g$ by the interaction of the helices on this member and the sleeve, the spring $p$ between the input and output members being meanwhile compressed. As soon as, by this angular movement, the pinion teeth move into coincidence with the spaces between the teeth on the engine wheel, the said spring will impart axial movement to the output member for effecting engagement of the pinion and wheel. The pinion and wheel having been thus engaged, the electric motor is then set in motion, and the interaction of the helices on the input member and sleeve will cause the plates of the friction clutch to be tightened to enable the starting torque to be transmitted. After the engine has been started, the mechanism is returned to its initial position by axial movement of the input member.

The control of the motor is effected by any convenient switch. Preferably the switch is adapted to be operable by the lever $d$. In the example illustrated the switch is indicated by $q$ and is of the push-button type which controls an electromagnetically operable switch, the latter serving to control the supply of current to the motor. On the lever $d$ is formed an abutment $s$ which serves to actuate the switch, and in this lever is formed an elongated hole $t$ through which passes the pivot pin $u$ of the lever $d^1$. Further the lever is loaded by a spring $v$ which holds the levers in the position shown. To bring the mechanism into action, the first effect of movement of the lever against the action of the spring is to take up the lost motion between the pivot pin $u$ and one end of the hole $t$. Continued movement of the lever imparts the desired axial movement to the member $b$ and later closes the switch $q$. After the engine has been started, release of the lever $d^1$ enables the spring $v$ to impart an initial movement to the lever $d$ which serves to take up the lost motion then existing between the other end of the hole $t$ and the pin $u$, so permitting the switch to re-open and cause the motor to come to rest. The subsequent action of the spring on the lever effects return of the member $b$ to its initial position. The provision of the lost motion above mentioned between the lever $d$ and its pivot $u$, is required to meet the condition that in the event of the pinion $h$ being engaged with the wheel $i$ when (through some accidental cause) the latter has become locked and consequently is immovable by the action of the motor on the pinion $h$, the switch can re-open for bringing the motor to rest when the force exerted by the driver on the lever $d^1$ is released.

The invention is applicable in essentially the same manner where instead of an electric motor a small engine or other means is used as the power source, excepting that the switch actuating means is omitted, or is substituted by any other source control device.

Having thus described my invention what I claim as new and desire to secure by Letters Patent is:

An engine starting mechanism for use in conjunction with an electric driving motor having a rotatable shaft for actuating the mechanism, comprising in combination an input member having means for effecting a slidable but non-rotatable connection with the motor shaft, and provided with an external quick-pitch helix, a sleeve mounted on the input member and provided with an internal quick-pitch helix which is complementary to and engages the external quick-pitch helix of the input member, a hollow output member having thereon an engine-starting pinion, a friction clutch interconnecting the sleeve and the output member, a spring located between the input and output members, a manually operable lever for imparting axial movement to the input member, a motor-controlling switch operable by the lever, a pivot on which the lever is mounted, and a lost-motion connection between the lever and its pivot.

References Cited in the file of this patent

UNITED STATES PATENTS 1,883,331    Bijur  ---------------- Oct. 18, 1932
1,892,056    Jackson et al. ------------ Dec. 27, 1932